United States Patent [19]

Magolske et al.

[11] Patent Number: 5,074,405
[45] Date of Patent: Dec. 24, 1991

[54] RIGHT ANGLE TRANSFER DECK

[75] Inventors: Charles J. Magolske, Chicago, Ill.; Harold Plostnieks, North Wales, Pa.

[73] Assignee: FMC Corporation, Chicago, Ill.

[21] Appl. No.: 651,038

[22] Filed: Feb. 1, 1991

Related U.S. Application Data

[63] Continuation of Ser. No. 544,804, Jun. 28, 1990, abandoned, which is a continuation of Ser. No. 343,486, Apr. 25, 1989, abandoned.

[51] Int. Cl.$^5$ ............................................. B65G 13/02
[52] U.S. Cl. .............................. 198/786; 193/35 MD
[58] Field of Search ...................... 198/786, 787, 782; 193/35 MD

[56] References Cited

FOREIGN PATENT DOCUMENTS

| 2515009 | 10/1976 | Fed. Rep. of Germany | 198/787 |
| 2728739 | 1/1979 | Fed. Rep. of Germany | 198/787 |
| 2174966 | 11/1986 | United Kingdom | 198/786 |

*Primary Examiner*—D. Glenn Dayoan
*Attorney, Agent, or Firm*—Ronald C. Kamp; R. B. Megley

[57] ABSTRACT

A right angle deck having a plurality of shafts with alternating left and right hand roller clusters. A single motor is connected to rotate the shafts with left hand clusters and a single motor is connected to rotate the shafts with right hand clusters; the motors being independently controlled and reversible.

2 Claims, 1 Drawing Sheet

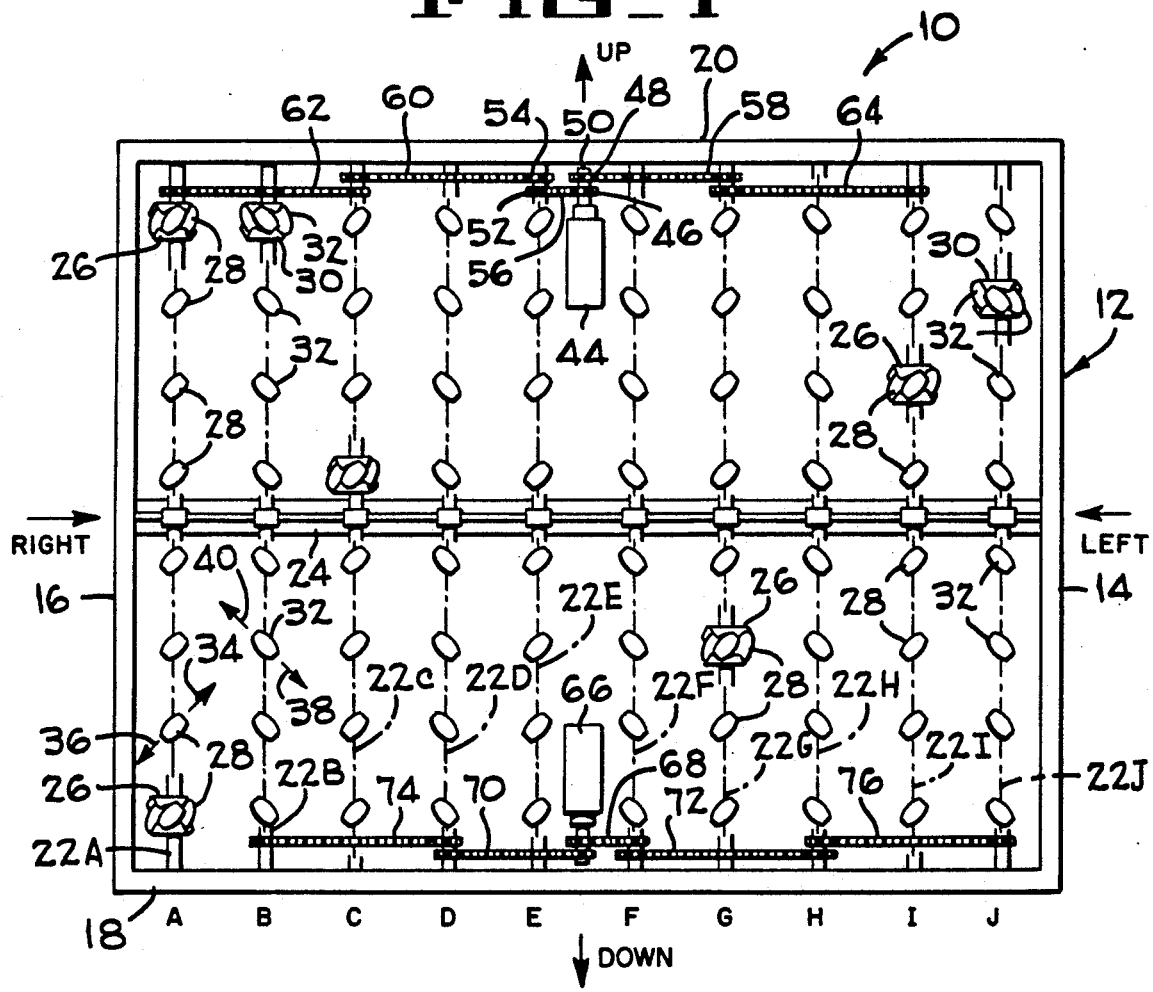

RIGHT ANGLE TRANSFER DECK

This application is a continuation of Ser. No. 544,804 filed on June 28, 1990 now abandoned, which is a continuation of application Ser. No. 07/343,486, filed Apr. 25, 1989 now abandoned.

This invention relates to conveyor systems generally, and more particularly, to right angle transfer decks.

A conveyor system, such as a land-side or fixed air cargo system, for example, requires means for rotating about a vertical axis the articles conveyed thereby, as well as means for transferring or shifting such articles, i.e., moving the articles at right angles or transverse to the former direction of movement, without rotation. The number of such rotate means, i.e., rotate decks, required in any system is usually far less than the number of such right angle transfer means, i.e., right angle transfer decks, because the conveyed article usually needs to be rotationally positioned only once while the conveyed article may be selective transferred at right angles at each intersection of straight conveyors in the system, as well as at each place of discharge from the system. Usually a rotate deck can also function as a right angle transfer deck, but a right angle transfer deck cannot function as a rotate deck. Rotate decks require complex structures and/or several independently controllable power sources and hence are difficult and expensive to manufacture and maintain. The need for an effective, reliable, and relatively inexpensive right angle deck is apparent.

The present invention provides a right angle transfer deck which reliably and consistently side-shifts conveyed articles upon demand and yet functions just as reliably and consistently as a straight conveyor when desired, which is relatively simple and inexpensive to manufacture and maintain, and which requires fewer components and, in particular, a minimum number of independently controllable power sources or motors.

BRIEF DESCRIPTION OF THE DRAWINGS

These and other attributes of the present invention, and many of the attendant advantages thereof, will become more readily apparent from a perusal of the following description and the accompanying drawings.

FIG. 1 is a top plan view of a right angle deck, with portions thereof eliminated or illustrated schematically for clarity, according to the present invention; and FIG. 2 is a table showing the direction of rotation required of the various shafts incorporated into the deck of FIG. 1 in order to achieve the direction of movement for the conveyed article.

DETAILED DESCRIPTION OF THE PREFERRED EMBODIMENT

Referring now to FIG. 1, there is shown a deck, indicated generally at 10, having a frame 12 which is formed by rigidly connecting a pair of shorter structural members 14 and 16 and a pair of longer structural members 18 and 20. These members form a generally rectangular outline in plan form, which preferably is proportional to and compatible with the dimensions of the largest pallet to be handled by the deck 10. Such pallets would be conveyed onto the deck 10 from the left or the right by the system with which the deck is associated with the long axis of the pallet transverse to the shorter members 14 and 16, and discharged from the top or bottom, i.e., in the direction of the up or down arrows with the long axis of the pallet remaining essentially perpendicular to the shorter members 14 and 16. Similarly, the pallets could be conveyed onto the deck 10 from either the UP or DOWN direction and discharged to either the LEFT or the RIGHT with the long axis of the pallet oriented as explained before. The pallets, or any other flat-bottomed article, can be conveyed from left to right, or right to left, and from top to bottom and vice versa.

A plurality of shafts 22A–22J extend across the frame 12 and are journaled at each end by conventional bearings in the longer beams 18 and 20. The plurality shafts are preferably even in number and are arranged parallel to each other and spaced essentially an equal distance apart. Preferably., the shafts are rotatably supported by bearings a carried by a support member 24 extending between and connected to the shorter members 14 and 16 intermediate their ends. This support member 24 permits smaller diameter shafts 22A–22J without encountering excessive deflection from the bending loads imposed by the weight of the articles conveyed by the deck.

Each of the shafts 20A, 20C, 20E, 20G and 20I have a plurality of clusters 26 affixed thereto with a plurality of barrel-shaped rollers 28 freely rotatable thereon. The rollers 28 are oriented with their axes at substantially a forty-five degree angle relative to the axis of the shaft to form a right hand cluster. Clusters 30 are affixed to the shafts 20B, 20D, 20F, 20H and 20J. Each cluster 30 has a plurality of barrel-shaped rollers 32 freely rotatably thereon. The rollers 32 are oriented with their axes at substantially a forty-five degree angle relative to the axis of the shaft to form a left hand cluster. The clusters 26 and 30 may be similar to the clusters utilized in pending patent application Ser. No. 781,443, filed Sept. 27, 1985.

The rollers 28 and 30 contact and support the bottom of the containers or pallets. When the shafts on which the clusters are mounted are rotated, the rollers exert a force on the bottom of the containers along the axis of rotation for the rollers, as indicated by the arrows associated with the single roller 28 in the lower left corner of the deck 10. Rotation of the shafts 22A, 22C, 22E, 22G and 22I in a clockwise direction (The direction of rotation here, and as referred to hereinafter, is as viewed looking up from the lower side of the deck 10 in FIG. 1.), the force exerted on the bottom of a container in contact with the rollers 28 will be along the axis of the rollers 28 in the direction of the arrow 34. Rotation of the aforementioned shafts in a counterclockwise direction will cause each roller 28 in contact with the container to exert a force in the direction of the arrow 36. Similarly, rotation of the shafts 22B, 22D, 22F, 22H and 22J in a clockwise and counterclockwise direction will result in the roller 2 carried by the clusters 30 exerting a force in the direction of arrows 38 and 40, respectively. When all shafts are rotated clockwise, the component of the force indicated by arrow 34 in the UP direction is offset or canceled by the DOWN component of the force indicated by the arrow 38 and the components thereof directed toward the right cause the container to be translated toward the RIGHT. Similarly, rotation of all shafts in a counterclockwise direction will translate a container to the LEFT. Translating a container in an UP direction is achieved by rotating shafts 22A, 22C, 22E, 22G and 22I clockwise, while simultaneously rotating shafts 22B, 22D, 22F, 22H and 22J in a counterclockwise direction. Translation in a DOWN direction is achieved by reversing the directions of rotation recited immediately above.

A reversible rotary drive 44 has a pair of sprockets 46 and 48 secured to the output shaft 50 of the drive. A pair of sprockets 52 and 54 are secured to the shaft 22E. A chain 56 is trained over the sprockets 46 and 52 to drive the shaft 22E when the output shaft 50 of the drive 44 is rotated. A pair of sprockets are also attached to the shafts 22C and 22G with a chain 58 engaging the sprocket 48 to drive the shaft 22G and a chain 60 engaging the sprocket 54 to drive shaft 22C. A chain 62 trained over the other sprocket on shaft 22C to drive a sprocket affixed to the shaft 22A. The shaft 22I is driven by a chain 64. Thus, the shafts 22A, 22C, 22E, 22G and 22I are all driven in the same direction by the drive 44. Similarly, the shafts 22B, 22D, 22F, 22H and 22J are driven by a reversible motor 66 through a comparable arrangement of sprockets and chains 68, 70, 72, 74 and 76. The table of FIG. 2 illustrates the direction of rotation of each of the shafts 22A-22J in order to achieve the direction listed in the left column thereof. The direction of rotation is indicated by both an arrow and CW for clockwise and CCW for counterclockwise. The summation of the force components in the UP and DOWN directions is essentially zero when all shafts are rotated in the same direction, and the summation of the force components in the LEFT and RIGHT directions is essentially zero when adjacent shafts are rotated in opposite direction.

While a preferred embodiment of the present invention has been illustrated and described herein, various changes may be made therein without departing from the spirit of the invention as defined by the scope of the appended claims.

What is claimed is:

1. A deck incapable of rotating pallets having longitudinal lengths substantially longer than their transverse lengths but capable of accurate and predictable transport of said pallets in the direction of their longitudinal lengths and right angle transfer in a direction transverse thereto, said deck comprising:
    a rectangular frame having long sides and short sides;
    a plurality of shafts extending between said long sides and rotatably mounted thereon;
    a plurality of roller clusters mounted on and rotatable with each shaft;
    the rollers of each cluster being angled in the same direction to form one of a left and a right hand cluster;
    the clusters on each shaft being of the same hand;
    the clusters on adjacent shafts being of the opposite hand; and
    reversible drive means connected to independently rotate the shafts with clusters of the same hand in the same direction.

2. The invention of claim 1 wherein said reversible drive means comprises:
    a single drive means connected to rotate all of the shafts with right hand clusters; and
    a single second drive means connected to rotate all of the shafts with left hand clusters.

* * * * *